Oct. 15, 1929.  B. D. McINTYRE  1,732,103
AUTOMOBILE HEATER
Filed July 11, 1927  3 Sheets-Sheet 1
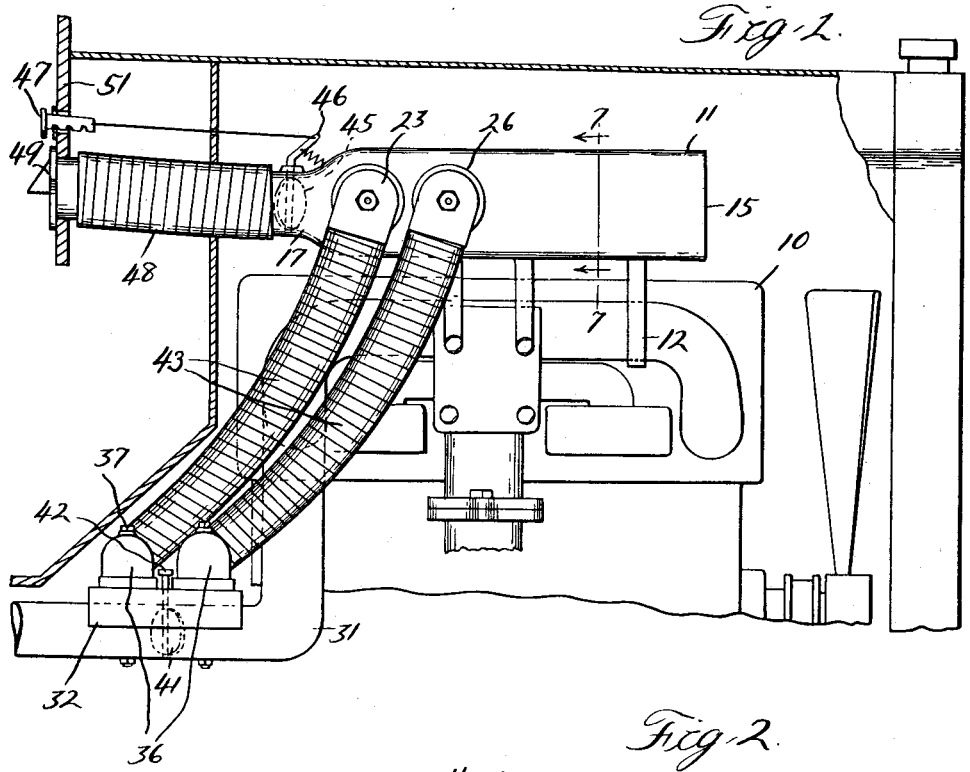
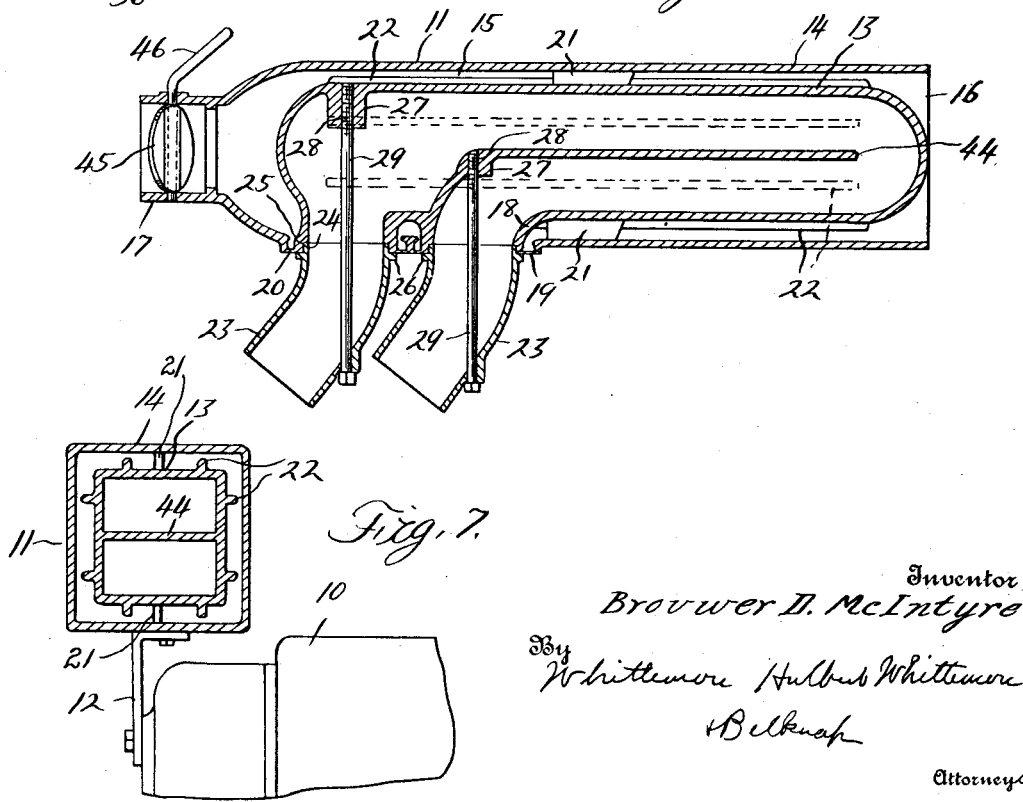
Inventor
Brouwer D. McIntyre
By Whittemore Hulbert Whittemore
& Belknap
Attorneys Oct. 15, 1929.  B. D. McINTYRE  1,732,103
AUTOMOBILE HEATER
Filed July 11, 1927   3 Sheets-Sheet 2
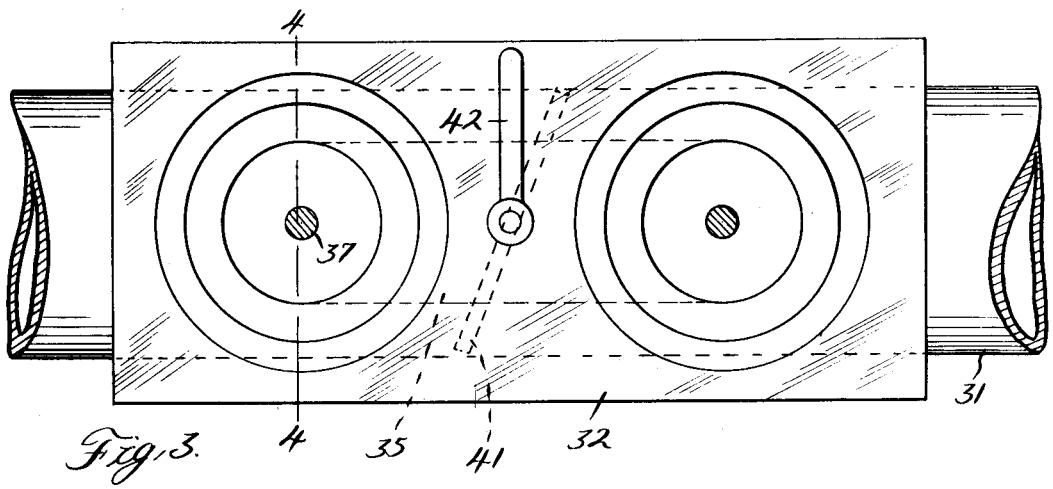
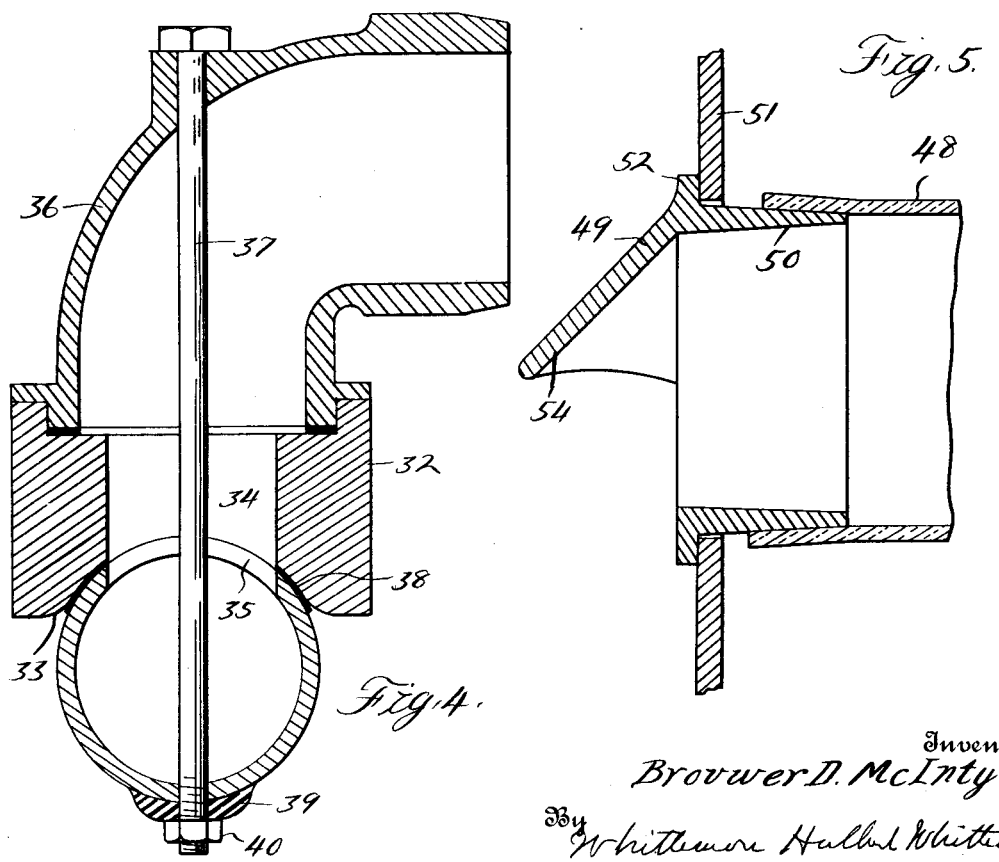
Inventor
Brower D. McIntyre Oct. 15, 1929.  B. D. McINTYRE  1,732,103
AUTOMOBILE HEATER
Filed July 11, 1927  3 Sheets-Sheet 3
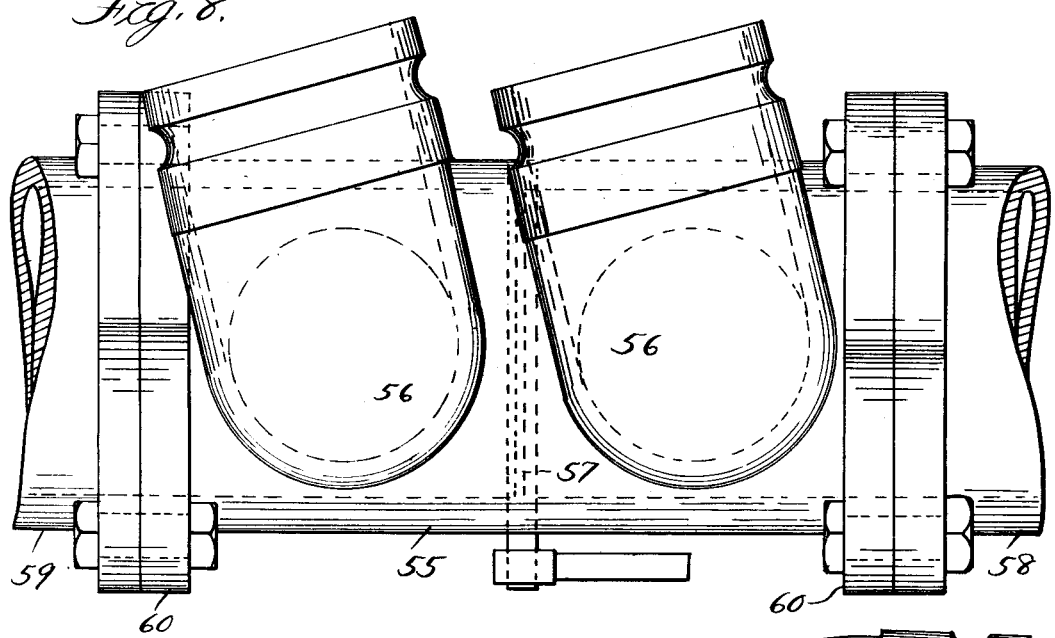
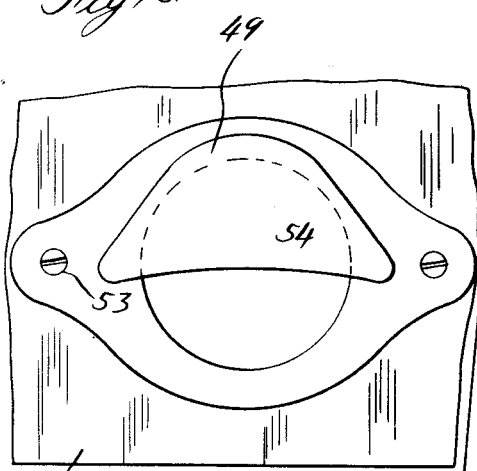
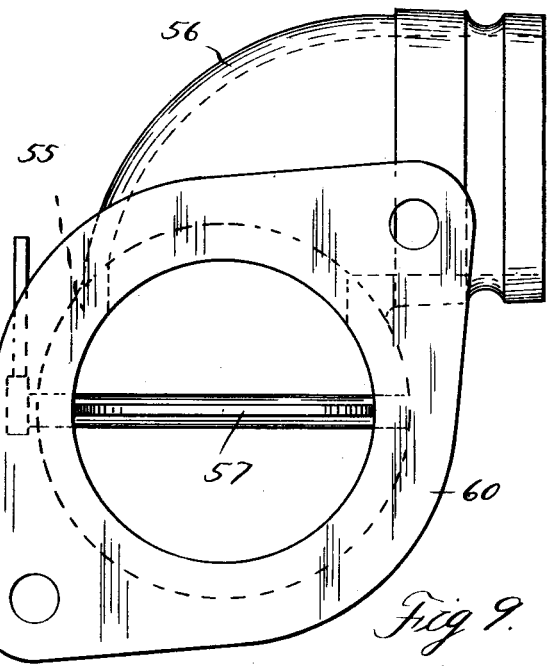
Inventor
Brower D. McIntyre Patented Oct. 15, 1929

1,732,103

UNITED STATES PATENT OFFICE

BROUWER D. McINTYRE, OF MONROE, MICHIGAN

AUTOMOBILE HEATER

Application filed July 11, 1927. Serial No. 204,943.

This invention relates to automobile heaters and more particularly to improvements in the construction of such devices whereby to render the same universally adaptable to various designs and makes of motor vehicle engines.

The invention contemplates the provision of a heater unit consisting of a chamber adapted to receive the exhaust gases and a surrounding casing spaced on all sides therefrom and forming therewith an air passage open at the front end and provided with a valve control rear end. The invention further contemplates means for supporting or associating the heater unit with an internal combustion engine at or adjacent the top thereof and preferably spaced therefrom and further contemplates means for connecting the chamber of the heater unit to the exhaust pipe of the engine, said means including swivelly connected elbows associated with the heater unit and the exhaust pipe whereby these elbows may be turned to any angle whereby to facilitate the connection of the conduits or tubes employed for conducting the exhaust gases from the exhaust pipe to the heater and back to the exhaust pipe.

The invention also contemplates the provision of a novel heat outlet or register and an improved form of casting whereby liability of the main casting cracking under torsional strains, is minimized.

Numerous advantages result from the herein described construction. It will be noted that the heater is entirely disassociated from the manifold so as not to retain heat therein in the summer which would affect the valves and furthermore the exhaust manifold need not be altered or otherwise disturbed upon the attachment of this heater. By spacing the heater above the top of the engine any benefit obtainable from the heat rising from the engine is realized and the space between the heater and engine prevents any heat from the heater affecting the engine.

By providing elbows or fittings angularly adjustable the heater may be associated with any type of engine irrespective of the position or relation of the exhaust pipe. The invention contemplates the provision of a control valve in the exhaust pipe which may be so regulated in the summer as to render the heater inoperative thus eliminating the necessity of removing the heater in the summer months and in addition thereto a control from the dash is contemplated for regulating the flow of the heat into the interior of the vehicle.

The several objects, advantages and novel details of construction of this invention will be made more apparent as this description proceeds, especially when considered in connection with the accompanying drawings wherein:

Figure 1 is a fragmentary side elevation of a portion of a motor vehicle including an internal combustion engine showing the application of my improved heater.

Figure 2 is a longitudinal sectional view through the heater unit showing the elbows attached thereto.

Figure 3 is a fragmentary view of the exhaust pipe showing the exhaust pipe fitting associated therewith.

Figure 4 is a sectional view taken substantially on the plane indicated by line 4—4 in Figure 3.

Figure 5 is a fragmentary sectional view through the dash board of the vehicle illustrating the heat outlet.

Figure 6 is a front elevation of the heat outlet.

Figure 7 is a vertical sectional view taken substantially on the plane indicated by line 7—7 in Figure 1, and Figure 8 is a detail elevational view of a modified form of exhaust pipe fitting.

Figure 9 is an end elevation of Figure 8.

Referring now more particularly to the drawings wherein like reference characters indicate like parts, it will be noted that in Figures 1 and 7 I have illustrated an internal combustion engine 10 with which my improved heater unit indicated generally by the reference character 11 is associated. It is preferable that this heater unit be arranged at and supported upon the top of the engine and spaced therefrom and for this purpose I provide brackets 12 bolted to the engine and to the heater unit 11.

From Figure 2 it will be apparent that the heater unit 11 consists of an inner chamber 13 cast integral with an outer surrounding casing 14 which latter is spaced from the chamber 13 and forms therewith an air passageway 15 open at the front end as indicated at 16 and contracted at the rear end to form a tubular portion 17. The inner chamber 13 is adapted to receive the exhaust gases and for this purpose is provided with conduits 18 which extend through openings 19 in the outer casing 14. In casting the heater unit the conduits 18 extend into the openings 19 which are of larger diameter than the conduits 18 and the space between the conduits 18 and the edges of the openings 19 is closed by relatively thin walls or fins 20. These relatively thin walls are adapted to crack when the body of the casting is subjected to any undue torsional strains to thus prevent injury to the main body of the casting from this source.

In casting the heating unit, struts 21 are provided approximately intermediate the longitudinal length of the casting, these struts providing the spacing and support between the chamber 13 and the casing 14. The heater unit is also cast with a plurality of longitudinally extending radiating fins 22 on the outer surface of the wall of the chamber 13.

Associated with the heater unit 14 is a pair of fittings or elbows 23 provided with end portions 24 adapted to fit in a rabbet or shouldered recess 25 formed in the conduits 18. Each elbow or fitting is also formed with a shoulder 26 which seats upon the outer end of the conduit.

The casting is provided, in line with the axis of each conduit 18, with an enlargement 27 provided with a threaded recess 28 with which a bolt 29 passed through an aperture 30 in the elbow, is adapted to engage. Thus after the elbow has been placed into position in engagement with one of the conduits 18 the bolt 29 may be inserted and screwed into place whereupon the fitting 23 is secured in place. It is obvious with the herein described construction that each of the elbows is swivelly or adjustably connected to the heater unit so that it may be turned at the desired angle to facilitate the attachment of the conduit or tubes, yet to be referred to.

The reference character 31 indicates the exhaust pipe of the internal combustion engine and while in the present disclosure this exhaust pipe is illustrated as extending from the rear end of the engine, nevertheless, the position and relation of the exhaust pipe with reference to the engine will obviously vary according to the type and design of the engine. However, associated with the exhaust pipe is a fitting 32 in the form of a plate-like member having a concave face 33 adapted to embracingly engaging the exhaust pipe and provided with openings 34 adapted to register with an elongated opening 35 cut into the exhaust pipe. A pair of elbow fittings 36 are associated with the fitting 32 in the same manner as described in connection with the elbows 23 and these elbows are secured in place by means of bolts 37 which extend through the elbows and through the exhaust pipe 31. Gaskets 38 may be provided around the apertures 35 between the exhaust pipe and the fitting 32 and an asbestos packing 39 may be arranged between the nut 40 on one end of the bolt 37 and the adjacent surface of the exhaust pipe.

A butterfly valve 41 is introduced into the exhaust pipe at a point between the apertures 34 of the fitting 32 and controlled by a lever 42 mounted on the fitting 32. When this butterfly valve is adjusted to interrupt the passage of the exhaust gases through the exhaust pipe 31 they will pass up through the conduit to the chamber 13 and thence back to the exhaust pipe again but during the summer months or when the heater is to be permanently disconnected, lever 42 is so adjusted that valve 41 does not interrupt the passage of exhaust gases whereupon they will pass through the pipe 31 without being caused to pass through the chamber 13 of the heater.

The elbows 23 of the heater unit are connected to the elbows 36 of the exhaust pipe fitting by means of tubular conduits 43. The chamber 13 is divided longitudinally by means of a wall 44 whereby the exhaust gases entering one of the conduits 18 is caused to traverse the entire length of the chamber 13 before finding exit through the other conduit 18.

The heated air flowing from the heater unit is controlled by butterfly valve 45 operable by means of a lever 46 which may be controlled from the dash by control indicated generally by reference character 47.

The tubular end 17 of the heater unit is connected by means of a conduit 48 to a heat outlet or register 49. This heat outlet is provided with a tubular portion 50 which extends through an aperture in the dash board 51 and with a flange 52 which abuts the dash board, fastening members 53 being provided by means of which the element 49 is secured to the dash board. A downwardly extending inclined shield 54 is provided which deflects the heat downwardly toward the floor of the vehicle and spreads the heat across the floor.

It will be obvious that the ordinary control of the heat is accomplished by opening and closing valve 45 by control 47 but that when it is desired to permanently disconnect the heater, valve 41 is operated so that the exhaust gases may pass freely through the exhaust pipe and not be deflected into the chamber 13 of the heater unit.

It is obvious that the swivelly connected elbow fittings provide means for connecting the exhaust pipe to the heater unit irrespective of the position or relation of this pipe with respect to the engine.

In Figure 8 there is illustrated a modified form of exhaust pipe fitting which consists of a casting 55 provided with elbows 56 and a butterfly valve 57. In installing this fitting the exhaust pipe is cut off and the casting 55 is positioned between the end 58 of the exhaust pipe and the end 59 of the manifold, the fitting being provided with end flanges 60 to facilitate this connection. The conduits 43 will be connected to the elbows 56 as in the previously described constructions.

While the invention has been described and illustrated herein somewhat in detail it will be readily apparent that various changes may be resorted to in many of the essential and all of the non-essential details of the invention without departing from the spirit and scope thereof and to this end reservation is made to make such changes as may come within the purview of the accompanying claims.

What I claim as my invention is:—

1. In a heater for a motor vehicle having an internal combustion engine and an exhaust pipe therefor, a heater unit including a chamber provided with inlet and outlet openings, means for supporting said heater on said engine, said exhaust pipe being provided with a pair of openings, elbows adjustably connected respectively to said chamber and exhaust pipe openings and conduits respectively connecting said elbows.

2. In a heater for a motor vehicle having an internal combustion engine and an exhaust pipe therefor, a heater unit including a chamber provided with inlet and outlet openings, means for supporting said heater on said engine, said exhaust pipe being provided with a pair of openings, elbow units swivelly engaging said openings in said chamber and exhaust pipe, bolts for securing said elbows in place and conduits connecting the elbows at said chamber to those at said exhaust pipe.

3. In a heater for a motor vehicle having an internal combustion engine and an exhaust pipe therefor, a heater unit including a chamber provided with inlet and outlet openings, means for supporting said heater on said engine, said exhaust pipe being provided with a pair of openings, elbows adjustably connected to said chamber and exhaust pipe openings, conduits connecting said elbows, and a valve pivotally mounted in said exhaust pipe between the aforesaid exhaust pipe openings for controlling the flow of exhaust gases to said heater unit.

In testimony whereof I affix my signature.

BROUWER D. McINTYRE.